(12) United States Patent
Mazumdar et al.

(10) Patent No.: US 12,197,309 B2
(45) Date of Patent: Jan. 14, 2025

(54) CLOUD AGNOSTIC SHARED LOAD TESTING PLATFORM

(71) Applicant: SAP SE, Walldorf (DE)

(72) Inventors: Gaurav Mazumdar, Bangalore (IN); Santhosh Reddy Mereddy, Nalgonda District (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/552,472

(22) Filed: Dec. 16, 2021

(65) Prior Publication Data
US 2023/0195596 A1 Jun. 22, 2023

(51) Int. Cl.
*G06F 9/44* (2018.01)
*G06F 11/36* (2006.01)

(52) U.S. Cl.
CPC ...... *G06F 11/3612* (2013.01); *G06F 11/3688* (2013.01); *G06F 11/3692* (2013.01)

(58) Field of Classification Search
CPC ............. G06F 11/3612; G06F 11/3688; G06F 11/3692
See application file for complete search history.

(56) References Cited

U.S. PATENT DOCUMENTS

| | | | | |
|---|---|---|---|---|
| 9,032,373 | B1* | 5/2015 | Gupta | G06F 11/3688 717/127 |
| 2003/0012141 | A1* | 1/2003 | Gerrevink | H04L 43/50 370/392 |
| 2003/0069957 | A1* | 4/2003 | Malmskog | H04L 41/5083 709/223 |
| 2004/0205565 | A1* | 10/2004 | Gupta | G06F 11/3688 715/239 |
| 2014/0068335 | A1* | 3/2014 | Bromley | H04L 43/50 714/E11.177 |
| 2015/0039941 | A1* | 2/2015 | Kalyanasundram | G06F 11/3692 714/38.1 |

* cited by examiner

*Primary Examiner* — Hang Pan
(74) *Attorney, Agent, or Firm* — Buckley, Maschoff & Talwalkar LLC

(57) ABSTRACT

According to some embodiments, a system and method are provided comprising a product including multiple components, wherein the components are at least one of software stacks and services; a memory storing processor-executable program code; and a processing unit to execute the processor-executable code in order to cause the system to: receive an indication of two or more components to test with a respective load testing tool; receive a test configuration for each component; execute, via the load testing tool, a load test for each component using the respective test configuration to output a test result, wherein execution of the load test for at least two of the components occurs simultaneously; generate an aggregated report including the test result from each load test; and transmit the aggregated report to an end user. Numerous other aspects are provided.

19 Claims, 16 Drawing Sheets

① Load Test – General Information ② Schedule ③ Notifications ④ Load Test Configurations 2. Schedule Build Schedule
Time Zone —— 506   | Daily | ∨ |
                  | America/New_York | ∨ |
Time* —— 508      | 10:10 | 🕐 |

[Step 3]

FIG. 6

① Load Test – General Information    ② Schedule    ③ Notifications    ④ Load Test Configurations 3. Notifications Would you like to receive build notification?   Yes ○   ⟵ 702

Frequency   | Always ▸ |
Email*   | load-test-report-receiver@sap.com | ⓘ
Stack Webhook Url   | (Optional) Stack Webhook URL | ⓘ

[ Step 4 ]

① Load Test – General Information    ② Schedule    ③ Notifications    ④ Load Test Configurations

4. Load Test Configurations
List of Load Test Configurations

+   Edit   Delete

| ☐ Sequence | Name | Description | Load Test Tool | Component |
|---|---|---|---|---|

802 — Load Test–Component Configuration — 804

- 806 — Name*: *Enter Name for Load Test Component*
- 808 — Description: *Process Item Description*
- 810 — Component*: [ > ]
- 812 — Load Test Tool*: [ > ]
- 814 — Load Test Iterations*: [ > ]

Clear    Add    Cancel

① Load Test – General Information    ② Schedule    ③ Notifications    ④ Load Test Configurations

4. Load Test Configurations
List of Load Test Configurations

+    Edit   Delete

| Sequence | Name | Description | Load Test Tool | Component |
|---|---|---|---|---|

802 — Load Test–Component Configuration — 804

- 806 — Name*     *Enter Name for Load Test Component*
- 808 — Description    *Process Item Description*
- 810 — Component*
- 812 — Load Test Tool*
- 814 — Load Test Iterations*

JMeter
NeoLoad
Stress Stimulus
Agile Load
Artillery
nGrinder
Locust
SOATest

800

① Load Test – General Information  ② Schedule  ③ Notifications  ④ Load Test Configurations

4. Load Test Configurations
List of Load Test Configurations                                                        +  ⧉  ⊞  Edit  Delete

| ☐ Sequence | Name | | | mponent |

---

Load Test-Component Configuration

| Name* | WebService-LoadTest-UsingJMeter |
| Description | *Process Item Description* |
| Component* | Web Service |
| 1002 — Load Test Tool* | JMeter |
| 1004 — Load Test Iterations* | 3 ⧉ |
| 1006 — Source Repository* | https://github.com/jmeterbyexample/jmeter-test-sc... |
| Branch* | master |
| 1008 — Jmx Test Folder/File | *Enter .jmx file name/s with .jmx extension(comma seperated), in case if no input is provided it will execute all test plans* |
| Additional commands | -JThreadNumber=5 -JRampUpPeriod=1 -JIterations=10 -l results.csv |
| 1010 — Installed Jmeter Plugins | Click here to see the list of Installed Plugins |

Clear   Add   Cancel
              └─ 1012

*FIG. 10*

Load Test-General Information

Name: Load-Test-Demo
Description:
Requirement Jira:
Process Ownership:
Parallel Executions: true
Support Enabled: true
Team Name:

✎ Edit

Schedule

Shedule Type: Daily
Time Zone: America/New_York
Time: 10:10
Day:
Build Occurence:
Custom Schedule:

✎ Edit

Notifications

Would you like to receive build true
Notification:
Frequency: Always
Email ID: load-test-report-receiver@sap.com ✎ Edit

List of Load Test Configurations

| Sequence | Name | Description | Load Test Tool | Component | |
|---|---|---|---|---|---|
| 1 | WebService-Load Test-Using JMeter | | JMeter | | ✎ Edit |

Show Details

Save   Cancel

CLOUD AGNOSTIC SHARED LOAD TESTING PLATFORM

BACKGROUND

Enterprise Resource Planning (ERP) is an integrated management of an organization's processes, often in real time and mediated by software and technology. A number of products are developed and released to aid in the management of the organization. Each product may include several components and/or offer multiple services (e.g., user interface (UI) applications, databases, etc.). Before the product is released for use by the organization, it may be tested. Load testing is a non-functional software testing process in which the performance of a software application is tested under a specific expected load. The testing determines how the software application behaves while being accessed by multiple users simultaneously ("load"). This testing usually measures the speed (e.g., response time) and capacity (number of concurrent users the product can support) of the application.

There are a number of ways to perform load testing including, but not limited to, manual load testing, as well as with in-house developed load testing tools, open-source load testing tools and enterprise-class load testing tools. Each component/service of the product may have a specific load testing tool used therewith, where the load testing tool has its own infrastructure and required software. To run the load test, a user may have to procure a computer or order a virtual machine from a cloud provider to obtain the infrastructure. Then the user may have to download and install load testing tool software to execute the load test onto the computer/VM, as well as initiate the commands to trigger the load test. For each load testing tool, a load testing environment is created including load test scenarios and load test transactions (preparing data for each transaction; deciding on a number of users accessing the system; determining connection speeds; determining different browsers and operating systems used by the users; and configuring the different servers). Often periodic updates may be available for the load testing tool and may be required to properly execute the tool. The infrastructure set-up and updates may be a manual process that takes a lot of time and may include errors. Additionally, these tests may individually test the load for each component/service, but do not operate together to test a load for multiple components/services of the product executing at a same time, as occurs during execution in a production environment.

Systems and methods are desired which support a single platform which offers configurable load testing using multiple tools.

BRIEF DESCRIPTION OF THE DRAWINGS

FIG. 6 is an expanded view of the user interface in FIG. 5 according to some embodiments.
FIG. 7 is a user interface according to some embodiments.
FIG. 8 is a user interface according to some embodiments.
FIG. 9 is an expanded view of the user interface in FIG. 8 according to some embodiments.
FIG. 10 is a user interface according to some embodiments.
FIG. 11 is a non-exhaustive example of a list of process items to test according to some embodiments.
FIG. 12 is a non-exhaustive example of an aggregated report according to some embodiments.
FIG. 13 is a non-exhaustive example of test results according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Figure 1:
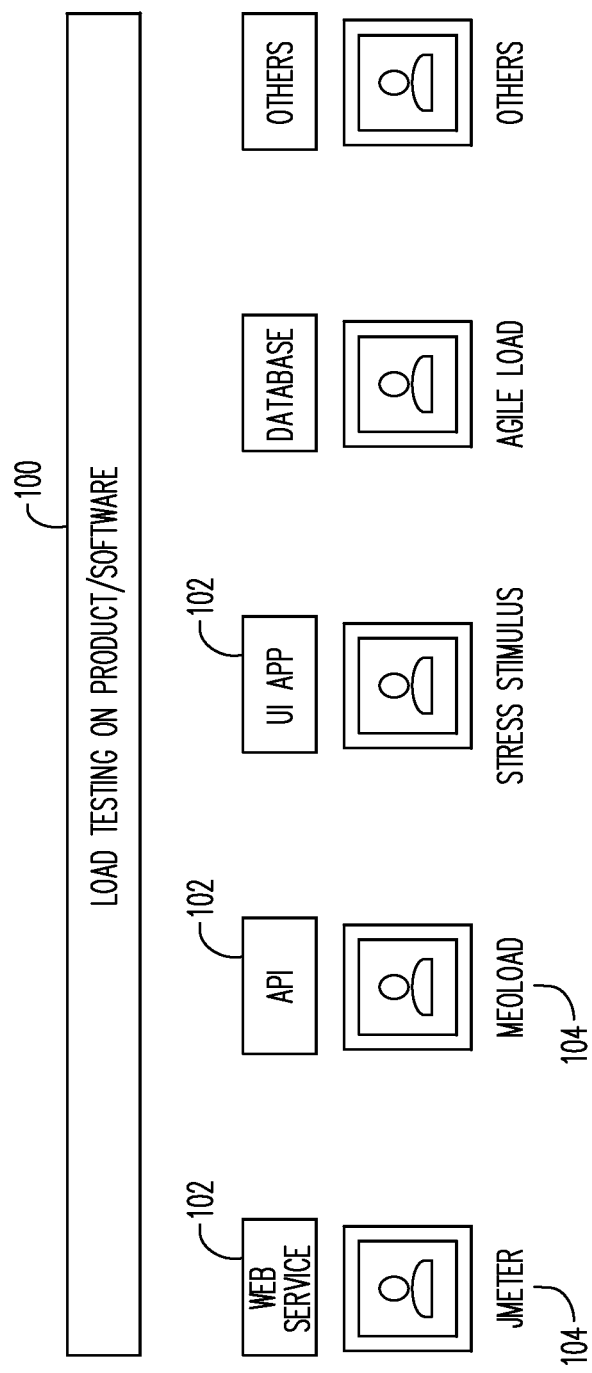
FIG. 1 is a block diagram of a non-exhaustive example of a product according to some embodiments.

A given product includes different components and/or offers different services (e.g., Application Programming Interface (API), web service, User Interface (UI) application, Database, etc.). When a product/software contains multiple stacks and services (e.g., Web services, API, UI application, Database, Mobile application, etc.) it may be important to perform load testing of the entire product to emulate the end user/real life working of the product under load. Conventionally, this is difficult as tools and frameworks used for load testing the given system component have different tools for each system component/service. For example, FIG. 1 shows a product/software 100 including a plurality of components 102 (Web Service, API, UI App, Database, Others, etc.). Each component 102 uses a specific load testing tools 104 for load testing the component 102. For example, the Web service component 102 uses JMeter load testing tool 104, the API component 102 uses the NeoLoad load testing tool 104, the UI app component 102 uses the Stress Stimulus load testing tool 104, the Database component 102 uses the Agile Load load testing tool 104. While it is possible to use multiple tools and frameworks to perform load testing, all these tests have to be orchestrated at once to have a realistic usage of the software and its performance when all components/services are under stress at a same time. Another challenge with these conventional load testing tools is that to use a load testing tool, an infrastructure needs to be set up for each tool, and then this infrastructure needs to be maintained over time (e.g., when the software for the tool has updates, etc., they need to be incorporated into the infrastructure, etc.); both of these are tedious manual activities. Additionally, after the product is in use, it is also important to make sure the bevy of constant infrastructure heavy product application upgrades does not reduce the overall performance of the tool. This can only be achieved if the product is constantly put under test by simulating usage or load before the upgrades are released.

Another challenge is that each tool reports the final results of their test in a specific format, which may be different for each tool. The end user may have to analyze each report separately to determine the performance if the component/service passes the load test.

Embodiments provide a shared load generation module in the cloud. The shared load generation module may help configure load test scripts created using different load testing tools and frameworks. Using these tests configured for different tools and frameworks, the shared load generation module provisions the infrastructure and runs the load tests on the system under test or applications under test. The shared load generation module avoids the manual overhead for the user of procuring and maintaining the load testing tool, such that the core responsibility of the user is now simply to define how to test the different components of the product. After the tests are executed, the shared load generation module generates performance reports, with the data generated during the load test shared with the end user, thereby providing for load testing using multiple tools and frameworks seamlessly in a single platform.

The shared load generation module may set up and maintain the infrastructure for each of the load testing tools. Maintenance activities of updates/upgrades of different tools and frameworks are automated to have minimal effort for an organization. The shared load generation module may save a lot of effort in infrastructure costs (low Total Cost of Operation (TCO)), maintenance, scalability, multi-cloud, extendable and inter-operability.

The shared load generation module may also provide for the configuration of load tests created using different load testing tools and frameworks with unique features and capabilities. Then, based on the configurations, different kinds of load for a given product may be generated and different components of the product may be simultaneously tested. As a non-exhaustive example, to test a UI component and a database component, the shared load generation module may allow a user to set up a configuration for each test from a single platform (e.g., for the UI test, 500 users accessing the UI; for the database test, 300 users accessing the database), and then execute the tests simultaneously to test the load created by 500 users accessing the UI while 300 users access the database. The shared load generation module may also provide a consolidated report that includes a result of each test as compared to a pre-defined threshold. Continuing with the above example, the shared load generation module may generate a report that indicates the status of the UI component test as "failed" and the database component as "passed". An end user may select a link in the report to obtain more specific information about each of the tests.

The present invention provides significant technical improvements to facilitate dynamic load testing with multiple load testing tools in a shared platform. The present invention is directed to more than merely a computer implementation of a routine or conventional activity previously known in the industry. The present invention provides improvement beyond a mere generic computer implementation as it provides: a cloud agnostic scalable platform for dynamic load generation using divergent load testing tools and frameworks for analogous testing of all possible integrating software and hardware components of a system. By providing a shared load generation platform in a cloud, end users may be able to bring in desired load tests created using different load testing tools and frameworks and create a configuration to generate a desired load on the product created by multiple tools. The single shared platform provided by embodiments allows the end user to consume their desired load testing tools to generate different kinds of load for a given product and simultaneously test different components of the product. Embodiments provide scalability and elasticity with respect to load testing. Embodiments provide for the decentralization of the effort which went into managing the load testing tools and their respective executing environments and exterminates the losses incurred due to unavailability of testing infrastructure. Embodiments may provide for the generation of load on-demand, scheduled, sequentially, parallelly, exponentially, etc.

Figure 2:
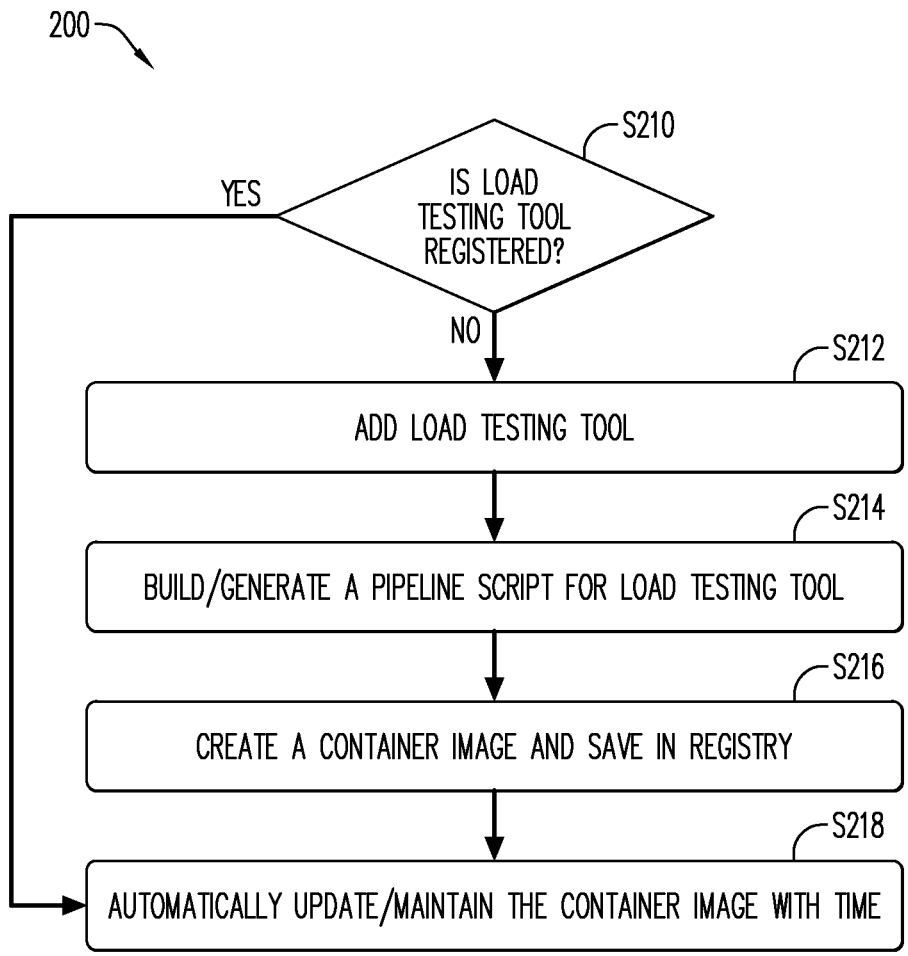
FIG. 2 is a flow diagram according to some embodiments.

FIGS. 2-16 include flow diagrams of processes 200 (FIG. 2) for requesting new tools, i.e., an onboarding process which builds/auto-generates a pipeline script which creates container images and regularly updates, process 300 (FIG. 3) for configuring and executing a load test, and process 1500 (FIG. 15) for executing a request for load testing, according to some embodiments. Processes 200, 300, 1500 may be executed by the software architecture 1400 according to some embodiments. In one or more embodiments, the software architecture 1400 (e.g., cloud platform 1406) may be conditioned to perform the processes 200, 300, 1500 such that a processor 1610 (FIG. 16) of the system 1400/1600 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interfaces 400, 500, 700, 800, 1000, 1300 (FIGS. 4, 5, 7, 8, 10 and 13) may be presented on any type of display apparatus (e.g., desktop monitor, smartphone display, tablet display) provided by any type of device (e.g., desktop system, smartphone, tablet computer). One or more embodiments may include a UI renderer which is executed to provide the above-listed user interfaces and may comprise a Web Browser (e.g., as part of the Web client 1403), a standalone application, or any other application. Embodiments are not limited to user interface 400, 500, 700, 800, 1000 and 1300 of FIGS. 4, 5, 7, 8, 10 and 13.

Initially, at S210, it is determined whether two or more given load testing tools 104 are registered with the shared load generation module 1404. For example, a user (e.g., developer, business user (administrator, consultant, etc.), etc.) may be interested in executing two or more tools (wherein a load testing tool is executable for each respective component), and the shared load generation module 1404 may determine whether the tools are already registered with (e.g., supported by) the module. In a case it is determined the load testing tool 104 is not supported by the shared load generation module 1404, the load testing tool(s) 104 may be added to the module 1404 at S212 via an onboarding process.

Then, after adding the load testing tool 104 to the shared load generation module 1404 at S212, the process 200 proceeds to S214. In S214, a Continuous Integration/Continuous Delivery (CI/CD) pipeline script 1405 is built/generated for each of the two or more load testing tools 104. The CI/CD pipeline script 1405 may include a series of steps that may be performed in order to deliver a new version of software. The CI/CD pipeline script 1405 may automate the software delivery process by building code, running tests (CI), and safely deploying a new version of the application (CD) (load testing tool). The CI/CD pipeline script 1405 may automate the updating/upgrading of the load testing tools 104, as described further below with respect to S218.

Following the building/generation of the CI/CD pipeline script 1405 in S214, a container image 1434 is created and saved in a container image registry 1437 in S216 for each of the two or more load testing tools 104. The container image 1434 may be a Docker® image or any other suitable image. The container image 1434 may be a static file with executable code that can create a container on a computing system. A container image is a file/repository of files which is/are pulled down from a Registry Server and used locally as a mount point when starting containers. A container is the runtime instantiation of a container image. The container image is immutable, meaning it cannot be changed, and can be deployed consistently in any environment. The container image is a set of instructions, like a blueprint/template, to run/execute a container. The container image 1434 contains an operating system, application code, libraries, tools dependencies and other files needed to make an application run. Containers are dependent on images and use them to construct a run-time environment and run/execute an application. Embodiments maintain a container image 1434 for each load testing tool 104 in a container image registry 1437. The load testing tool 104 may be an open-source tool or may be a subscription-based tool.

In S218, the container image is automatically updated/maintained over time. S218 may follow from S216 or S210 (in a case it is determined the load testing tool is registered with the shared load generation module 1404). Whenever the shared load generation module 1404 detects a delta change in the load testing tools via the CI/CD pipeline 1405, the module 1404 automatically updates the stored version of the tool by building a new/different container image 1434 that may be used for testing. The shared load generation module 1404's generation of the container image 1434 and creation of the CI/CD pipeline 1405 extinguishes the need for the user to manually create and maintain the load testing tool 104.

Figure 3:
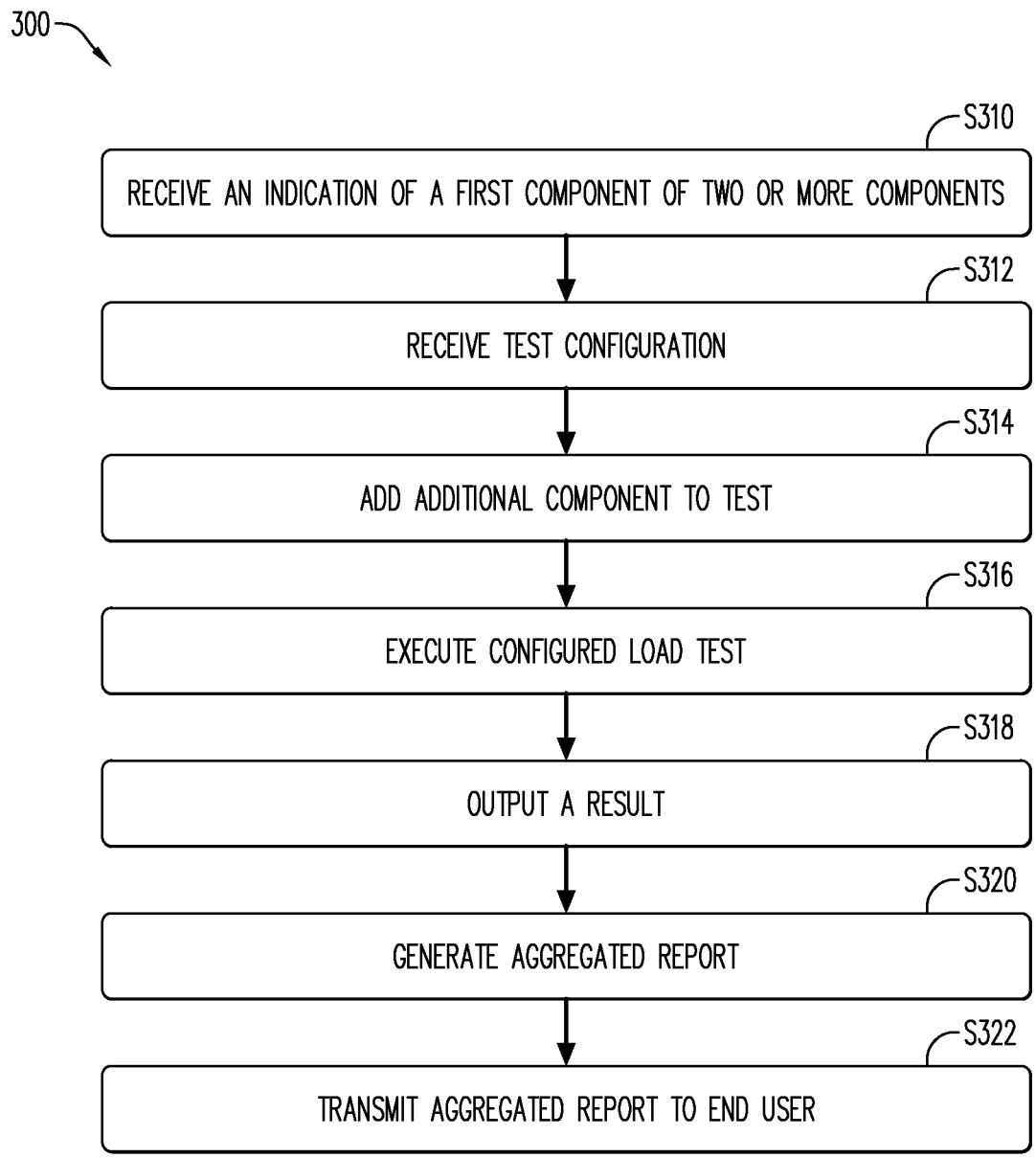
FIG. 3 is a flow diagram according to some embodiments.
Figure 4:
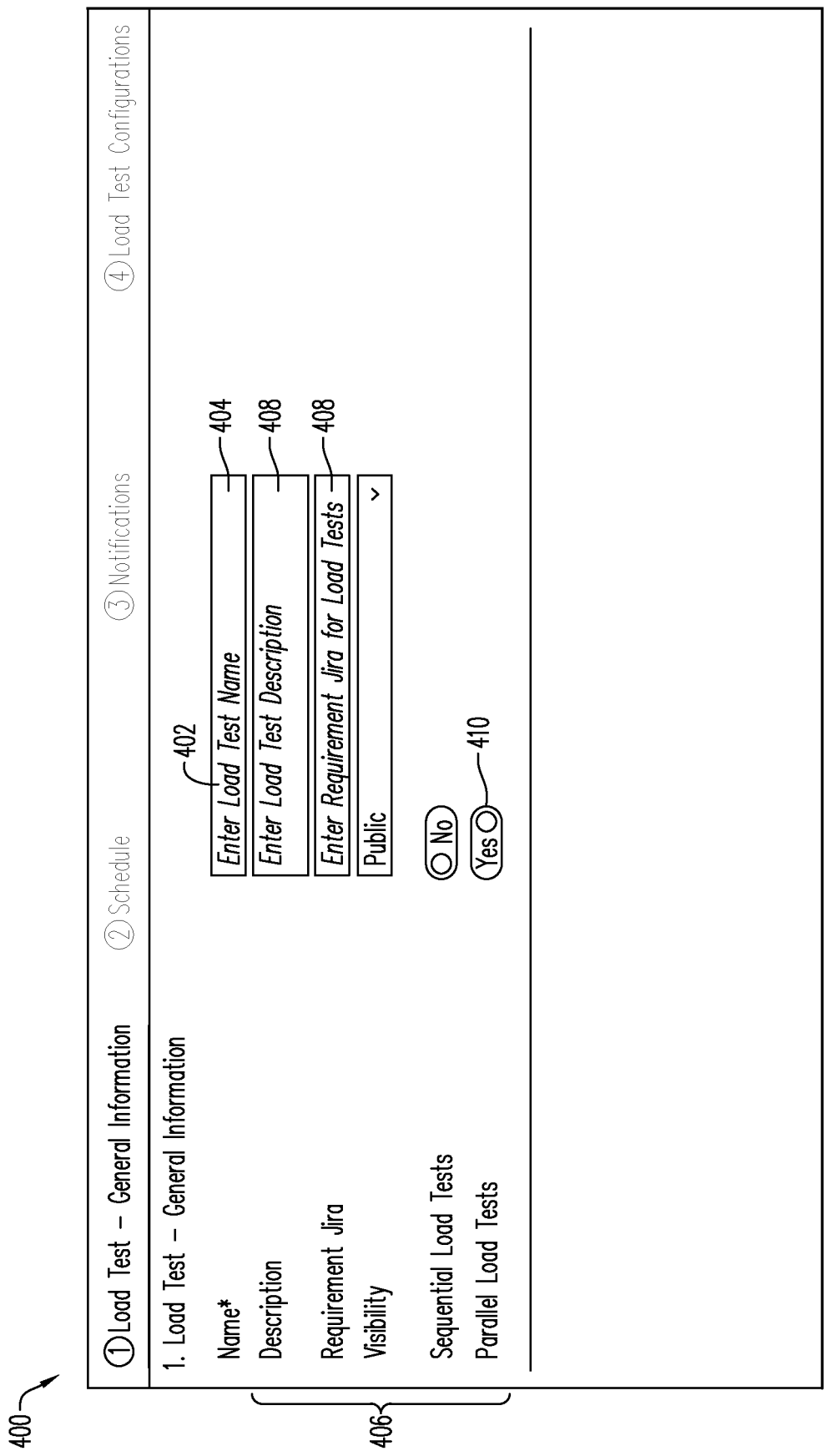
FIG. 4 is a user interface according to some embodiments.

Turning to FIG. 3, the process 300 for configuring and executing a load test is provided.

Initially, at S310, an indication of a first component of two or more components 102 of the product 100 to test with a respective load testing tool 104 is received. The indication may be received at a load test—general information user interface 400 (FIG. 4) via entry of a component name value 402 in a name user entry field 404. While a user entry field is shown herein, the indication may be made via any other suitable indication (e.g., selection via drop-down menu, radio button, etc.). The load test—general information user interface 400 may include additional user entry fields 406. Additional values 408 may be received in the additional user entry fields 406 to configure a load test 1407. The additional user entry fields 406 include, but are not limited to, a description of the component to test, a requirement Jira, a visibility of the test (public (visible to all users on the platform) vs private (visible to the creator only) vs. shared (visible to the team (group of members) to which the process is shared)), a toggle button to 'Sequential Load Tests' and a toggle button for "Parallel Load Tests" 410. Selection of "yes" via the toggle button 410, provides for the shared load generation module 1404 to execute two or more load tests 1407 at a same time. The set-up of the additional test will be described further below.

Figure 5:
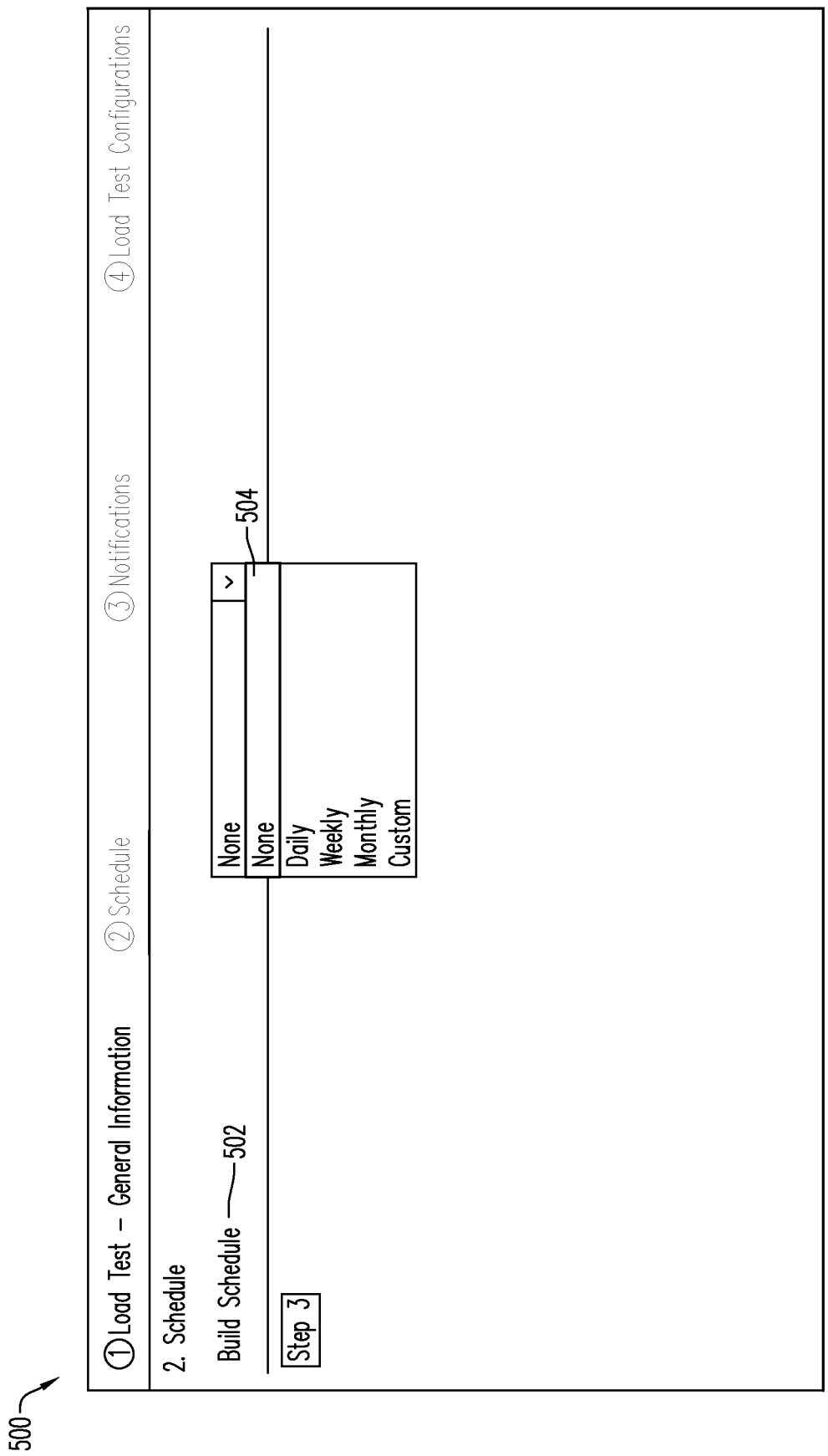
FIG. 5 is a user interface according to some embodiments.

Next, at S312 a test configuration 1409 for the load test 1407 is received. In one or more embodiments, a first step in the configuration may be to select a build schedule 502 via a build schedule user interface 500 (FIG. 5). The build schedule 502 may be the schedule for executing the load test 1407. The build schedule 502 may be selected via a drop-down menu 504, as shown herein, or via any other suitable selector. Non-exhaustive examples of the build schedule 502 may be none, daily, weekly, monthly, and custom. In embodiments, the schedule for executing the load test 1407 may also include selection of a time zone 506 and a time 508 via the process build schedule user interface 500 (FIG. 6). A second step in the configuration may be to configure notifications 702 via a notification user interface 700 (FIG. 7). Notifications 702 may include, but are not limited to a toggle button for whether the user would like to receive build notification, a frequency of the notifications (e.g., always, on success, on failure—if there is a failure of the test, etc.); a user entry field to receive one or more email addresses to receive the notifications, and a user entry field to receive slack webhook URL. A third step in the configuration may be list of Load Test Configuration items 802 via a Load Test—Component Configuration user interface 800 (FIG. 8). The Load Test—Component Configuration 802 may include user entry fields 804 to receive a name 806 of the load tests to be configured on the component; a description 808 of the load test; a component 810 (e.g., Web Service/Rest API/SOAP API/ODATA/UI/Database/File Transfer Protocol, mobile applications, multi-browser load, secure and non-secure protocols, proprietary text/binary protocols, WebRTC, HTML5, AJAX, Android, and WPF) a load test tool 812 (e.g., JMeter, NeoLoad, Stress Stimulus, Agile Load, Artillery, nGrinder, Locust, SOATest, etc.) as shown in FIG. 9; a load test iterations 814 indicated a number of times for the load test to be performed in a loop. It is noted that the components and load test tools listed herein are non-exhaustive examples, and other suitable components and load test tools may be used.

In one or more embodiments, an expanded Load Test—Component Configuration user interface 1000 may be provided, as shown in FIG. 10, for example. The Load Test—Component Configuration user interface 1000 may include a source repository 1002 (link to the load test files (e.g., Github)), a branch 1004 (e.g., Github branch where load tests reside), a Test Folder/File 1006 (e.g., if more than one test is present in the test repository, execute a specific test file, or run all test files if maintained blank)), an Additional Commands field 1008 (any additional run/execute command to be used while performing load tests) and an Installed JMeter Plugins field 1010 (e.g., shows list of plugins available as a part of container image). In some embodiments, the user may have a repository (not shown) of tests external to the container 1434.

Next in S314, the user may select an add button 1012 to add an additional component (e.g., second component) to test. The configuration process described in S312 may be repeated for each added component. After all of the components to test in parallel/sequentially are added, the user may select the add button 1012 again. In some embodiments, the user may be presented with a review page including a list 1100 of the load test configurations (components to test), as shown in FIG. 11, and which may be saved.

Then, in S316, the configured load test 1407 for each component is executed, as described further below with respect to FIG. 1500. The execution of the load test for at least two of the components may occur simultaneously when the parallel execution toggle button is selected as "yes".

Execution of the plurality of load tests outputs a result 1436 in S318. The execution of each load test 1407 may output a respective result 1436. The output result 1436 may be in a given form (e.g., JSON, HTML, XML, etc.) for the particular load testing tool 104. Then in S320, the shared load generation module 1404 generates an aggregated report 1438 (FIG. 12) including an analysis 1202 (e.g., success or failure) of test results from each load test. In one or more embodiments, for each result, a parser 1439 of the shared load generation module 1404 may parse the result 1436 and compare the parsed result to a user-defined threshold. In a case that the parsed result is within a limit of the user-defined threshold 1440, the product may be within an acceptable limit for the tested load. As a non-exhaustive example, for a UI application component, the threshold 1440 is defined as two seconds. If the executed load test selects an item on the UI and the UI does not respond in two seconds, the UI application has failed. The analysis 1202 of the test results is the output of the comparison of the parsed result to the user-defined threshold and may be noted as a status of pass/fail. In one or more embodiments, the aggregated report 1438 may include an analysis for each of the executed load tests, as shown, for example, in FIG. 12. Next, in S322, the aggregated report 1438 is transmitted to an end user 1402.

Figure 13:
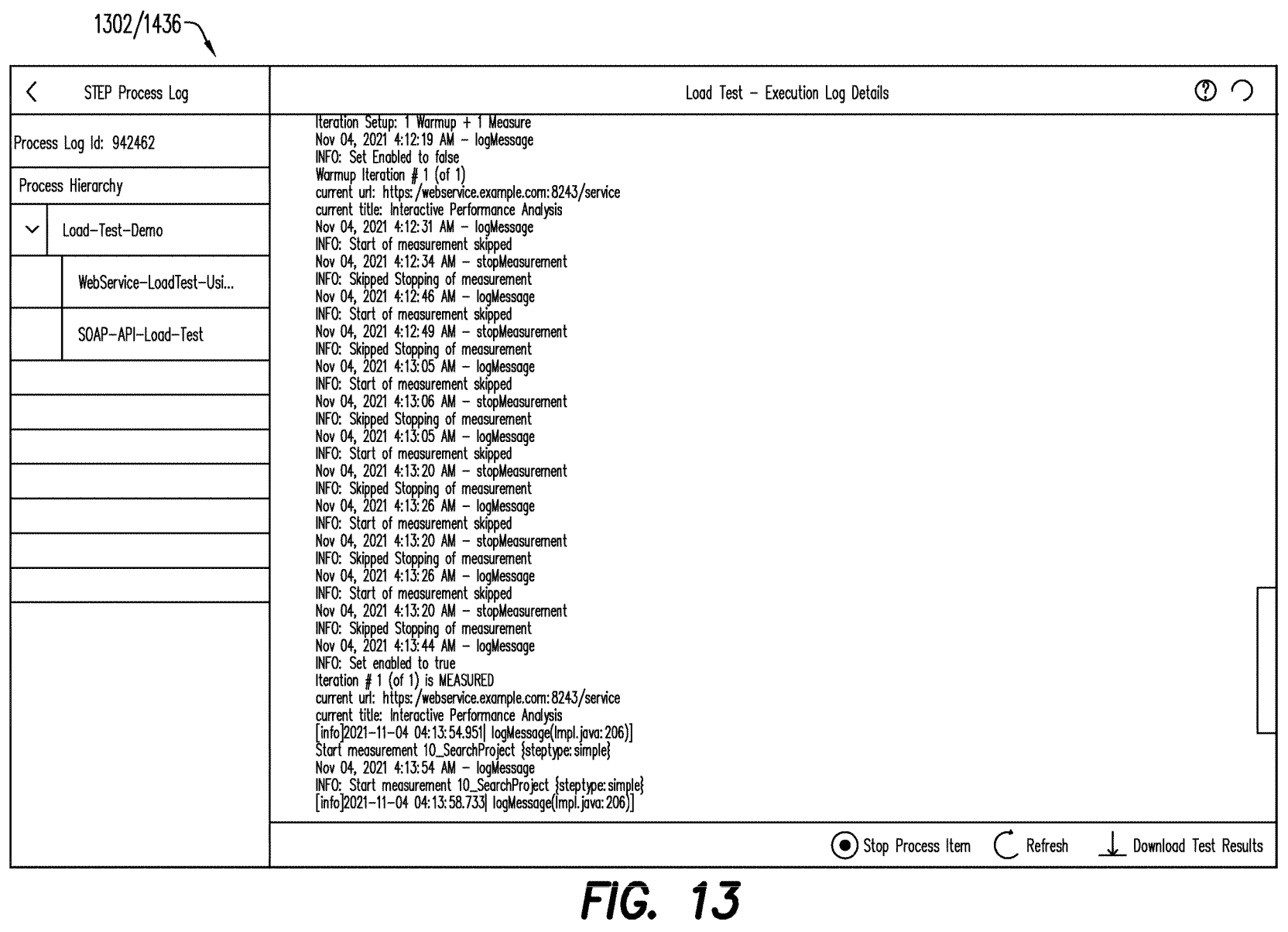

In one or more embodiments, the aggregated report 1438 may include a link 1204 via the test name, as a non-exhaustive example, for each of the load testing tool, such that selection of the link 1204 displays for the user the output result 1436 (e.g., in the form of log details 1302 as shown in FIG. 13) of the particular test. In some embodiments, selection of the link may also provide one or more suggested next steps.

Figure 14:
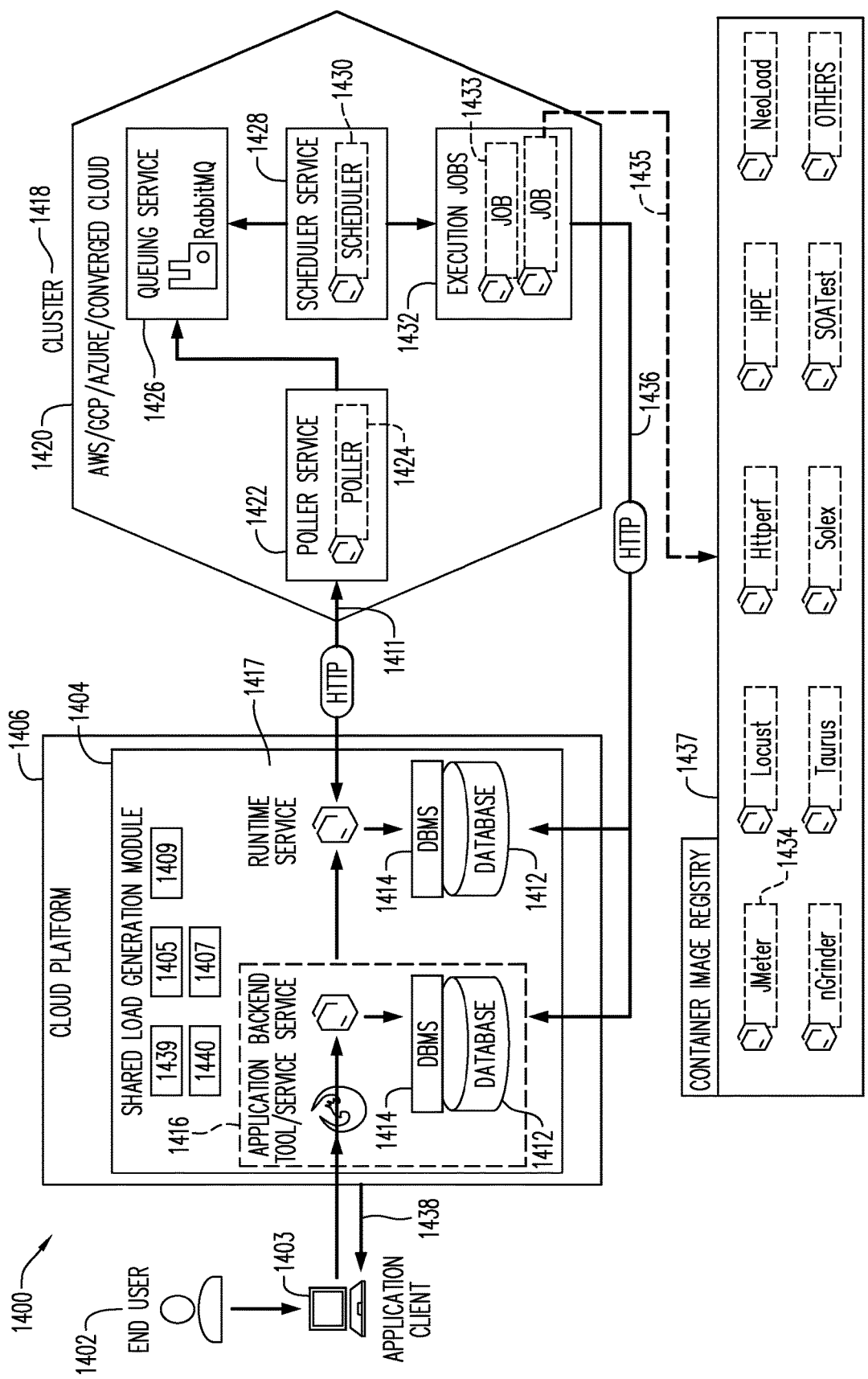
FIG. 14 is a block diagram of a system architecture according to some embodiments.

FIG. 14 is a block diagram of system architecture 1400 according to some embodiments. Embodiments are not limited to architecture 1400.

Architecture 1400 includes a client/end user 1402, an application/web client 1403, a shared load generation module 1404, a cloud platform 1406, a database 1412, and a database management system or service (DBMS) 1414. The applications may comprise server-side executable program code (e.g., compiled code, scripts, etc.) executing within the cloud platform 1406.

In the example architecture of FIG. 14, the software architecture may include the cloud platform 1406. Cloud platform 1406 provides any suitable environment that allows clients 1402 to communicate with a UI application (described further below) hosted by the shared load generation module 1404 executing on the cloud platform 1406. The cloud platform 1406 may also support scaling of shared load generation module components.

One or more applications executing on the cloud platform 1406 may communicate with DBMS 1414 using database management interfaces such as, but not limited to, Open Database Connectivity (ODBC) and Java Database Connectivity (JDBC) interfaces. These types of applications may use Structured Query Language (SQL) to manage and query data stored in database 1412.

DBMS 1414 serves requests to retrieve and/or modify data of database 1412, and also performs administrative and management functions. Such functions may include snapshot and backup management, indexing, optimization, garbage collection, and/or any other database functions that are or become known. DBMS 1414 may also provide application logic, such as database procedures and/or calculations, according to some embodiments. This application logic may comprise scripts, functional libraries and/or compiled program code.

Cloud platform 1406 may be separated from, or closely integrated with, DBMS 1414. A closely-integrated cloud platform 1406 may enable execution of server applications completely on the platform, without the need for an additional application server. For example, according to some embodiments, cloud platform 1406 may provide a comprehensive set of embedded services which provide end-to-end support for Web-based applications. The services may include a lightweight web server, configurable support for OData, server-side JavaScript execution and access to SQL and SQLScript. The cloud platform 1406 may be a platform as a service for creating new applications or extending existing applications, as well as load testing products in a secure cloud computing environment. The cloud platform 1406 may include a runtime service 1417 that may provide an intermediate persistence layer for test execution requests which will be consumed by a poller service 1422 deployed in a cluster 1418.

Cloud platform 1406 may provide application services (e.g., via functional libraries) which applications may use to manage and query the data of database 1412. The application services can be used to expose the database data model, with its tables, hierarchies, views and database procedures, to clients. In addition to exposing the data model, cloud platform 1406 may host system services such as a search service.

Other applications related to load test executions may be performed inside the cluster 1418 (and especially execution jobs 1433). Any of the applications described herein may include application code.

The end user/client 1402/1403 may comprise one or more individuals or devices executing program code of a software application for presenting and/or generating user interfaces to allow interaction with the shared load generation module 1404. Presentation of a user interface as described herein may comprise any degree or type of rendering, depending on the type of user interface code generated by the shared load generation module 1404.

For example, end user 1402 may execute the Web client 1403 to request and receive a Web page (e.g., in HTML format) from the cloud platform 1406 to access the shared load generation module 1404 via HTTP, HTTPS, and/or WebSocket, and may render and present the UI according to known protocols. The client 1402/1403 may also or alternatively present user interfaces by executing a standalone executable file (e.g., an .exe file) or code (e.g., a JAVA applet) within a virtual machine.

Database 1412 may store data used at least by the shared load generation module 1404 and the applications. For example, database 1412 may store values that may be used by the shared load generation module 1404 during the execution thereof.

Database 1412 may comprise any query-responsive data source or sources that are or become known, including but not limited to a structured-query language (SQL) relational database management system. Database 1412 may comprise a relational database, a multi-dimensional database, an Extensible Markup Language (XML) document, or any other data storage system storing structured and/or unstructured data. The data of database 1412 may be distributed among several relational databases, dimensional databases, and/or other data sources. Embodiments are not limited to any number or types of data sources.

In some embodiments, the data of database 1412 may comprise one or more of conventional tabular data, row-based data, column-based data, and object-based data. Moreover, the data may be indexed and/or selectively replicated in an index to allow fast searching and retrieval thereof. Database 1412 may support multi-tenancy to separately support multiple unrelated clients by providing multiple logical database systems which are programmatically isolated from one another.

Database 1412 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently used data) and one or more fixed disks (e.g., persistent memory for storing their respective portions of the full database).

The shared load generation module 1404 may also include an application tool/service 1416. The application tool/service 1416 may provide a user interface application for users to interact, and for users to configure automated load test executions. The application tool/service 1416 may also provide the users with the ability to orchestrate multiple simultaneous load test executions across multiple testing tools 104, where the executions occur on the cluster 1418, described further below. In some embodiments, at the end of the automated executions of the load tests 1407, the results 1436 may be extracted and stored in the common data store 1412. The user configuration (test executions, scheduling, build notifications, test results, configurations, definitions) received by the shared load generation module 1404 may be stored in the data store 1412 using the DBMS 1414.

The system may also include a cluster 1418. The cluster may be a Kubernetes cluster, or any other suitable cluster. The cluster 1418 may be a set of nodes that run/execute containerized applications. The cluster 1418 may be a scalable infrastructure that may scale up the number of virtual machines used, thereby accommodating the number of executions being requested. As described above, containerizing a load testing tool/application may package the load testing tool with its dependencies and some necessary services. The cluster 1418 may allow containers (including the load testing tool application with its dependencies and necessary services) to run across multiple machines and environments: virtual, physical, cloud-based and on-premises. The cluster 1418 may be comprised of one master node (not shown) and a number of worker nodes on which the services (e.g., poller service, scheduler service, execution jobs, etc.) run. As used herein, the terms "run" and "execute" may be used interchangeably. A master node may be a virtual machine on the cloud provider which hosts the required services of the cluster, while a worker node may be the virtual machines on the cloud provider where actual automatic executions of the user defined configurations are carried out (e.g., Database load test, UI load test, etc.). The cluster 1418 may also operate on a second cloud platform 1420. The inventors note that the shared load generation module 1404 and cluster 1418 may be on the same or different cloud platforms (e.g., module on AWS Cloud Platform, and cluster on GCP Cloud Platform). The second cloud platform 1420 may be the same or different from the cloud platform 1406 on which the shared automation module 1404 is located. Non-exhaustive examples of the second cloud platform 1420 are Amazon Web Services®, Google Cloud Platform®, Microsoft Azure®, SAP Converged Cloud®, etc.

A poller service 1422 may send a poll 1424 to the runtime service 1417 to retrieve execution requests (load test executions) 1411 that may be stored in the runtime service 1417 deployed on the cloud platform 1406. The poller service 1422 may calculate a priority of the execution request and may push the request 1411 to a queuing service 1426.

The queuing service 1426 may be RabbitMQ® or any other suitable queuing service. RabbitMQ® is an open-source message-broker software that implements an Advanced Message Queuing Protocol and is extended with a plug-in architecture to support Streaming Text Oriented Messaging Protocol, MQ Telemetry Transport and other protocols.

A scheduler service 1428 may include a scheduler 1430. The scheduler service 1428 may connect to the queuing service 1426 to retrieve execution requests and calculate the capacity of the cluster resources (e.g., is the required infrastructure available to run the database load test and the API load test). In a case that enough resources are available, the scheduler 1430 may schedule the executions immediately (execution jobs 1433). In one or more embodiments, the scheduler 1430 may determine the incoming execution demand versus the available capacity/resources in the cluster to carry out the execution. In a case the incoming demand is on the higher side, the scheduler 1430 may send a request to the platform via cluster API calls to create newer resources after which the executions may be carried out. Otherwise, in a case the demand cannot be fulfilled, the scheduler 1430 may keep the demand waiting in the queuing service 1426 and once the other ongoing executions are completed and resources are freed, the scheduler 1430 may process waiting execution requests from the queuing service 1426. In a case that enough resources are not available, the scheduler service 1428 may request the addition of more resources to the cluster 1418, and the requests are re-queried back to the queuing service 1426, for processing at a later time.

After determining the resources are available, the scheduler 1430 may create the execution jobs which will be scheduled on node (worker nodes/virtual machines) 1432. The execution node 1432 is the load test execution environment of the load testing tools 104. The environment may be a containerized environment created from a container image 1434 of the load testing tool 104. The executions are performed inside execution jobs 1433 which are scheduled on node 1432 (worker node/virtual machine), and the results may be posted to the application/service 1416 and runtime service 1417, where they may be temporarily persisted (via the database 1412). Additionally, a network channel 1435 may connect the execution jobs 1433 on a node 1432 to the container image 1434. The execution jobs 1433 may make use of the container images 1434 by downloading the image and then creating a container which is a run time environment of the specific tools, including required additional toolings/services. The container images 1434 are used to create a container (environment) which is used to carry out the execution through the network channel 1435. The updates and upgrades of different tools may be built as container images 1434 and pushed to the container image registry 1437, which are then used when the test executions are performed. It is noted that the built container images 1434 in the registry are the updated/upgraded versions of the tools. The building of the container images may occur—via the pipeline—at a time different from the time of actually running the load test. In this way, whenever a job is scheduled on the worker node, the downloaded container image is the updated/upgraded container image, and this updated/upgraded container image is used to run the testing.

As described above, the container image 1434 is a read-only template that contains a set of instructions for creating a container that can run on the container platform, such as a Docker® platform. The container image 1434 may provide a convenient way to reliably package applications, software, and pre-configured server environments. The container image 1434 may contain a runtime environment for each specific load testing tool, which can be used to perform execution of the tool. As described above, the container image 1434 is used by the execution jobs 1433 running on the node 1432 to provide an environment in which to perform the executions configured by the user, which may provide open network to communicate to multiple runtime image repositories (e.g., container image Registry).

Figure 15:
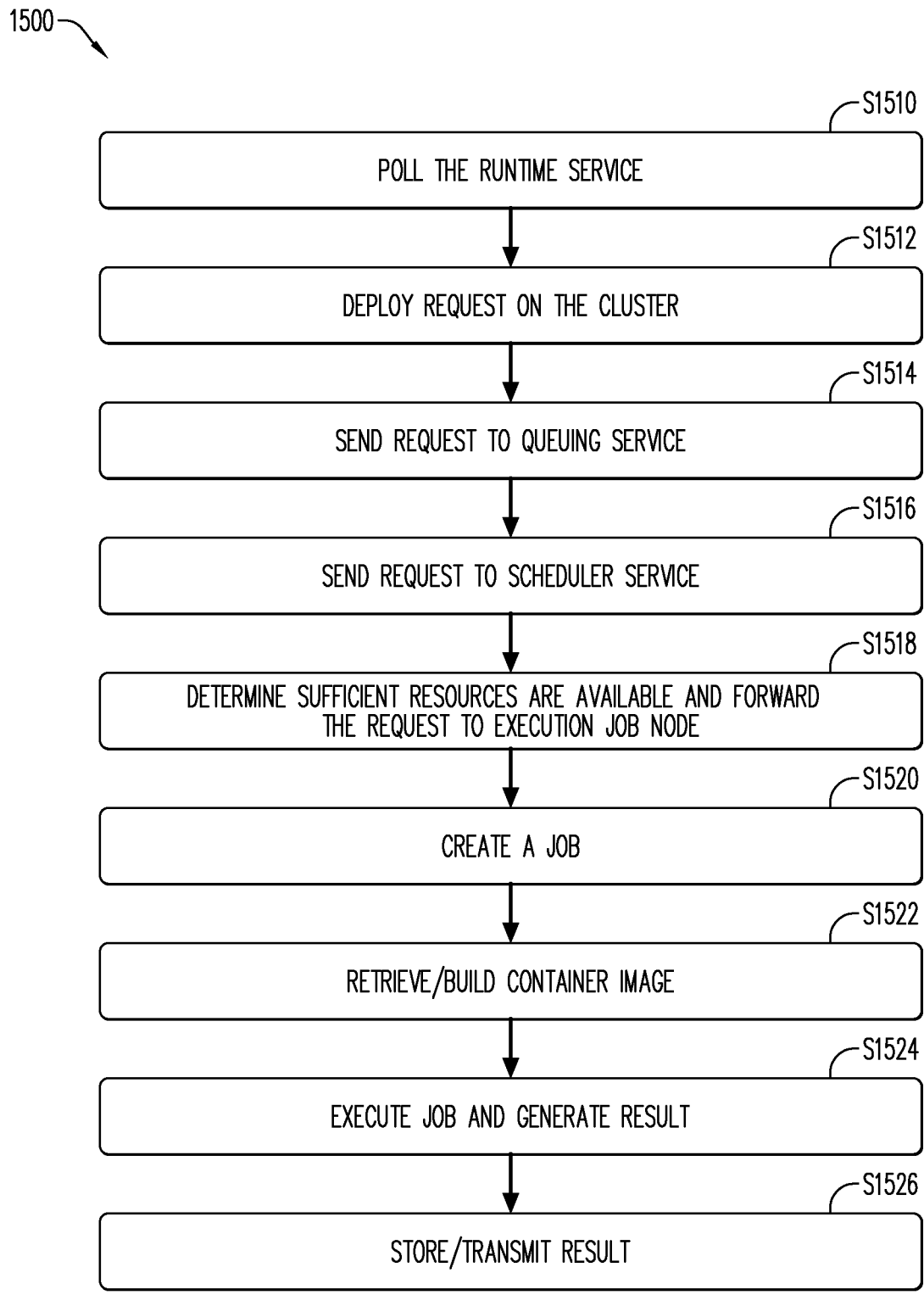
FIG. 15 is a flow diagram according to some embodiments.

A process 1500 for executing a request for load testing is provided in FIG. 15. Initially, at S1510, the runtime service 1417 receives a poll 1424 from the poller service 1422. In response to the poll 1424, a request 1411 for execution of two or more load tests is retrieved by the poller service 1422 and deployed on the cluster 1418 at S1512. Then the request 1411 may be sent to the queuing service 1426 at S1514 and forwarded to the scheduler service 1428 at S1516. Next, at S1518, after the scheduler service 1428 determines enough cluster resources are available, the request 1411 may be deployed by the scheduler service 1428 to the node 1432, where a job (execution job) 1433 is created in S1520. The execution jobs 1433 next retrieves a container image 1434 for that job 1433 at S1522, where the container image 1434 includes self-sufficient software. The execution node 1432 executes the job 1433 inside container which is created using the container image 1434 software etc. and generates test results 1436 at S1524. The test results 1436 may be returned to the cloud platform 1406, where they are aggregated by the shared load generation module 1404 to form the aggregated report 1438. Both the test results 1436 and the aggregated report 1438 may be stored in the common data store 1412 and returned to the end user 1402 at S1526.

Figure 16:
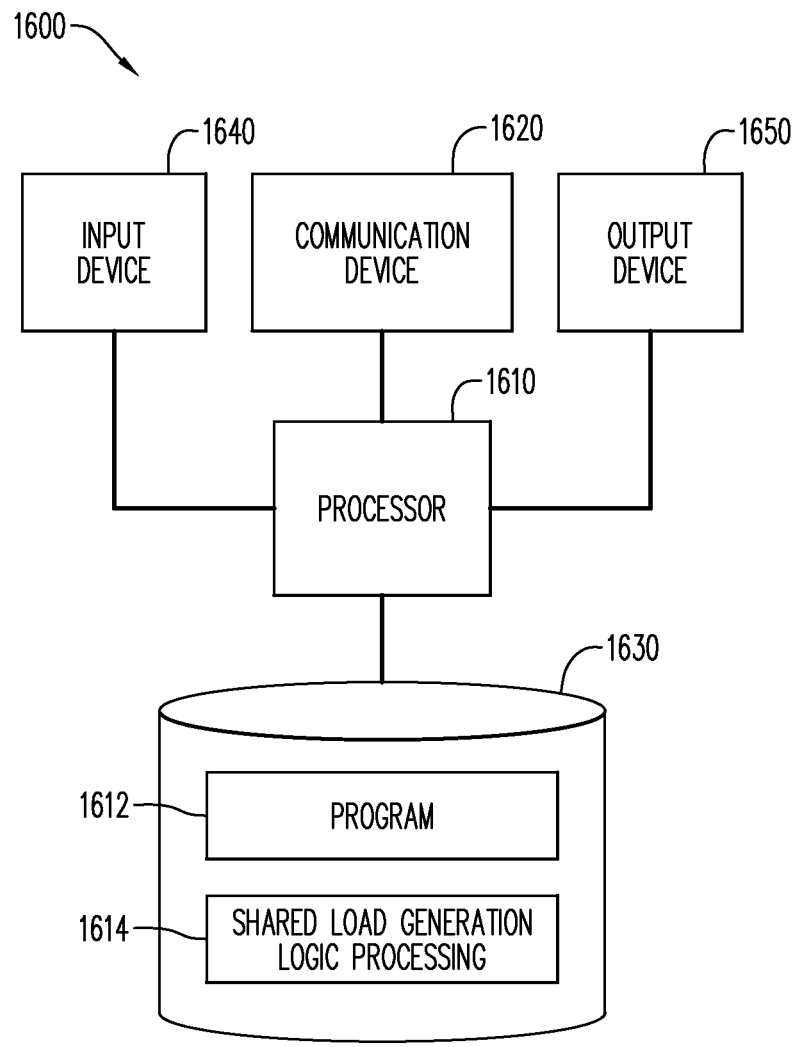
FIG. 16 is a block diagram of a system according to some embodiments.

FIG. 16 is a block diagram of apparatus 1600 according to some embodiments. Apparatus 1600 may comprise a general- or special-purpose computing apparatus and may execute program code to perform any of the functions described herein. Apparatus 1600 may comprise an implementation of one or more elements of system 1400. Apparatus 1600 may include other unshown elements according to some embodiments.

Apparatus 1600 includes a shared load generation processor 1610 operatively coupled to communication device 1620, data storage device/memory 1630, one or more input devices 1640, and one or more output devices 1650. Communication device 1620 may facilitate communication with external devices. Input device(s) 1640 may comprise, for example, a keyboard, a keypad, a mouse or other pointing device, a microphone, knob or a switch, an infra-red (IR) port, a docking station, and/or a touch screen. Input device(s) 1640 may be used, for example, to manipulate graphical user interfaces and to input information into apparatus 1600. Output device(s) 1650 may comprise, for example, a display (e.g., a display screen) a speaker, and/or a printer.

Data storage device/memory 1630 may comprise any device, including combinations of magnetic storage devices (e.g., magnetic tape, hard disk drives and flash memory), optical storage devices, Read Only Memory (ROM) devices, Random Access Memory (RAM) etc.

The storage device 1630 stores a program 1612 and/or shared load generation logic 1614 for controlling the processor 1610. It is noted that program 1612 and/or shared load generation logic 1614 may also be stored and executed from an application server or from any other environment (e.g., software architecture) that can execute software instructions. The processor 1610 performs instructions of the programs 1612, 1614, and thereby operates in accordance with any of the embodiments described herein, including but not limited to process as 200/300/1500. The executable instructions of the programs 1612, 1614 represent the executable instructions of the software architecture, including implementation of the methods, modules, subsystems and components and so forth described herein and may also include memory and/or storage modules, etc.

The programs 1612, 1614 may be stored in a compressed, uncompiled and/or encrypted format. The programs 1612, 1614 may furthermore include other program elements, such as an operating system, a database management system, and/or device drivers used by the processor 1610 to interface with peripheral devices.

The foregoing diagrams represent logical architectures for describing processes according to some embodiments, and actual implementations may include more, or different components arranged in other manners. Other topologies may be used in conjunction with other embodiments. Moreover, each system described herein may be implemented by any number of computing devices in communication with one another via any number of other public and/or private networks. Two or more of such computing devices may be located remotely from one another and may communicate with one another via any known manner of network(s) and/or a dedicated connection. Each computing device may comprise any number of hardware and/or software elements suitable to provide the functions described herein as well as any other functions. For example, any computing device used in an implementation of system 1400 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
   a single product including multiple components, wherein each of the multiple components is one of a software stack and a service;
   a memory storing processor-executable program code; and
   a hardware processing unit to execute the processor-executable program code in order to cause the system to:
   determine two or more load testing tools are registered, wherein a load testing tool is adapted for execution for each respective component of the single product;
   generate a continuous integration/continuous delivery (CI/CD) pipeline script for each load testing tool, wherein the CI/CD pipeline script:
   includes steps to detect a change in a current version of the load testing tool as compared to a stored version of the load testing tool, build code and run tests to integrate the code into a new version of the load testing tool,
   automatically obtains updates for the respective load testing tool; and
   provide a plurality of containerized load testing tools including a first containerized load testing tool and a second containerized load testing tool, wherein the first containerized load testing tool and the second containerized load testing tool are different types of load testing tools;
   deploy an updated version of each of the first containerized load testing tool and the second containerized load testing tool per the CI/CD pipeline script in a case an update is available;
   receive an indication of two or more components of the single product to test with a respective containerized load testing tool of the plurality of containerized load testing tools;
   receive a test configuration for each component of the single product;
   execute a first non-functional load test via the first containerized load testing tool, testing a first load on the first component;
   execute a second non-functional load test via the second containerized load testing tool, testing a second load on the second component, wherein the second load is different from the first load,
   wherein each non-functional load test is executed using the respective test configuration to output a test result,
   wherein execution of the first non-functional load test and the second non-functional load test for the two or more components of the single product occurs simultaneously and on a same worker node, and the simultaneous execution tests a response time and capacity of the two or more components of the single product to multiple users accessing the two or more components of the single product simultaneously;
   generate an aggregated report including the test result from each load test; and
   transmit the aggregated report to an end user.

2. The system of claim 1, wherein the multiple components of the single product are at least two of SOAP and REST web services, UI applications, Databases, File transfer protocol, Mobile application, Multi-browser load, secure and non-secure protocols, proprietary text/binary protocol, WebRTC, HTML5, AJAX, Android and WPF.

3. The system of claim 1, further comprising processor-executable program code in order to cause the system to, prior the provision of the plurality of containerized load testing tools:
   build a container image for each of the two or more load testing tools, forming a containerized load testing tool; and
   automatically update each container image as updates are available.

4. The system of claim 1, wherein the test result includes an analysis that is a comparison of a test result to a user-defined time threshold value.

5. The system of claim 1, further comprising a scheduler component adapted to schedule the simultaneous execution of the load tests.

6. The system of claim 1, wherein the aggregated report includes a link to the test results of each load test.

7. The system of claim 1, wherein the test configuration is received by a shared load generation module stored on a cloud platform.

8. The system of claim 1 further comprising a cluster adapted to execute the load test for each component of the single product.

9. The system of claim 8, wherein the cluster includes a plurality of worker nodes on which a poller service, scheduler service and execution jobs run.

10. A computer-implemented method comprising:
    determining two or more load testing tools are registered, wherein a load testing tool is adapted for execution for each respective component of a single product including multiple components;
    generating a continuous integration/continuous delivery (CI/CD) pipeline script for each load testing tool, wherein the CI/CD pipeline script:
    includes steps to detect a change in a current version of the load testing tool as compared to a stored version of the load testing tool,
    builds code and runs tests to integrate the code into a new version of the load testing tool, and
    automatically obtains updates for the respective load testing tool;
    providing a plurality of containerized load testing tools including a first containerized load testing tool and a second containerized load testing tool, wherein the first containerized load testing tool and the second containerized load testing tool are different types of load testing tools;
    deploying an updated version of each of the first containerized load testing tool and the second containerized load testing tool per the CI/CD pipeline script in a case an update is available;
    receiving an indication of a plurality of components of a single product to test with a respective containerized load testing tool of the plurality of containerized load testing tools;
    receiving a test configuration for each component of the single product;
    executing a first non-functional load test via the first containerized load testing tool, testing a first load on the first component;

executing a second non-functional load test via the second containerized load testing tool, testing a second load on the second component, wherein the second load is different from the first load, wherein each non-functional load test is executed using a respective test configuration to output a test result, wherein execution of the first non-functional load test and the second non-functional load test for the two or more components of the single product occurs simultaneously and on a same worker node, and the simultaneous execution tests a response time and capacity of the two or more components of the single product to multiple users accessing the two or more components of the single product simultaneously;

generating an aggregated report including the test result from each load test; and transmitting the aggregated report to an end user.

11. The computer-implemented method of claim 10, wherein at least two or more components of the single product are at least two of SOAP and REST web services, UI applications, Databases, File transfer protocol, Mobile application, Multi-browser load, secure and non-secure protocols, proprietary text/binary protocol, WebRTC, HTML5, AJAX, Android and WPF.

12. The computer-implemented method of claim 10, further comprising, prior to providing the plurality of containerized load testing tools:

building a container image for each of the two or more load testing tools, forming a containerized load testing tool; and automatically updating each container image as updates are available.

13. The computer-implemented method of claim 10, wherein the test result includes an analysis that is a comparison of a test result to a user-defined time threshold value.

14. The computer-implemented method of claim 10, wherein simultaneous execution of the two or more load tests is scheduled via a scheduler component.

15. The computer-implemented method of claim 10, wherein the aggregated report includes a link to the test results of each load test.

16. A non-transitory, computer readable medium having executable instructions stored therein to perform a method, the method comprising:

determining two or more load testing tools are registered, wherein a load testing tool is adapted for execution for each respective component of a single product including multiple components;

generating a continuous integration/continuous delivery (CI/CD) pipeline script for each load testing tool, wherein the CI/CD pipeline script:

includes steps to detect a change in a current version of the load testing tool as compared to a stored version of the load testing tool, builds code and runs tests to integrate the code into a new version of the load testing tool, and automatically obtains updates for the respective load testing tool;

providing a plurality of containerized load testing tools including a first containerized load testing tool and a second containerized load testing tool, wherein the first containerized load testing tool and the second containerized load testing tool are different types of load testing tools;

deploying an updated version of each of the first containerized load testing tool and the second containerized load testing tool per the CI/CD pipeline script in a case an update is available;

receiving an indication of two or more components of a single product to test with a respective containerized load testing tool of the plurality of containerized load testing tools;

receiving a test configuration for each component of the single product;

executing a first non-functional load test via the first containerized load testing tool, testing a first load on the first component;

executing a second non-functional load test via the second containerized load testing tool, testing a second load on the second component, wherein the second load is different from the first load, wherein each non-functional load test is executed using a respective test configuration to output a test result, wherein execution of the first non-functional load test and the second non-functional load test for the two or more components of the single product occurs simultaneously and on a same worker node, and the simultaneous execution tests a response time and capacity of the two or more components of the single product to multiple users accessing the two or more components of the single product simultaneously;

generating an aggregated report including the test result from each load test; and transmitting the aggregated report to an end user.

17. The medium of claim 16, wherein the multiple components of the single product are at least two of SOAP and REST web services, UI applications, Databases, File transfer protocol, Mobile application, Multi-browser load, secure and non-secure protocols, proprietary text/binary protocol, WebRTC, HTML5, AJAX, Android and WPF.

18. The medium of claim 16, further comprising executable instructions stored therein to perform a method, the method comprising, prior to providing the plurality of containerized load testing tools:

building a container image for each of the two or more load testing tools, forming a containerized load testing tool; and automatically updating each container image as updates are available.

19. The system of claim 1, wherein the aggregated report includes a link for each load testing tool and selection of the link outputs both: (i) an output result of the executed non-functional load test; and (ii) one or more suggested next steps.

* * * * *